US009840188B2

(12) United States Patent
Salter et al.

(10) Patent No.: US 9,840,188 B2
(45) Date of Patent: Dec. 12, 2017

(54) VEHICLE BADGE

(71) Applicant: Ford Global Technologies, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US); Michael A. Musleh, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/473,821

(22) Filed: Mar. 30, 2017

(65) Prior Publication Data

US 2017/0240100 A1 Aug. 24, 2017

Related U.S. Application Data

(63) Continuation of application No. 15/051,029, filed on Feb. 23, 2016, now Pat. No. 9,656,598.

(51) Int. Cl.

| | |
|---|---|
| ***B60Q 1/00*** | (2006.01) |
| ***B60Q 1/26*** | (2006.01) |
| ***F21K 9/64*** | (2016.01) |
| ***F21V 8/00*** | (2006.01) |
| ***B60R 13/00*** | (2006.01) |
| *F21Y 115/10* | (2016.01) |

(52) U.S. Cl.

CPC .......... *B60Q 1/2619* (2013.01); *B60Q 1/0011* (2013.01); *B60R 13/005* (2013.01); *F21K 9/64* (2016.08); *G02B 6/0055* (2013.01); *G02B 6/0075* (2013.01); *G02B 6/0083* (2013.01); *B60Q 2400/20* (2013.01); *F21Y 2115/10* (2016.08)

(58) Field of Classification Search

CPC ... B60Q 1/0011; B60Q 1/2619; B60R 13/005; F21K 9/64; G02B 6/0055; G02B 6/0075; G02B 6/0083

USPC ......................... 362/487, 496, 509–510, 545

See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |

(Continued)

FOREIGN PATENT DOCUMENTS

| | | | |
|---|---|---|---|
| CN | 101337492 | A | 1/2009 |
| CN | 201169230 | Y | 2/2009 |

(Continued)

*Primary Examiner* — Jason Moon Han

(74) *Attorney, Agent, or Firm* — Jason Rogers; Price Heneveld LLP

(57) ABSTRACT

A badge for a vehicle is provided herein. The badge includes a substrate attached to a housing. The housing has a viewable portion. A first light guide is operably coupled with a first light source. A second light guide is operably coupled with a plurality of second light sources. The geometric shape of the first light guide is varied from the second light guide.

16 Claims, 11 Drawing Sheets

32
36
28
34
38
30

(56) References Cited

U.S. PATENT DOCUMENTS

| | | | |
|---|---|---|---|
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |
| 7,015,893 | B2 | 3/2006 | Li et al. |
| 7,161,472 | B2 | 1/2007 | Strumolo et al. |
| 7,213,923 | B2 | 5/2007 | Liu et al. |
| 7,216,997 | B2 | 5/2007 | Anderson, Jr. |
| 7,264,366 | B2 | 9/2007 | Hulse |
| 7,264,367 | B2 | 9/2007 | Hulse |
| 7,441,914 | B2 | 10/2008 | Palmer et al. |
| 7,501,749 | B2 | 3/2009 | Takeda et al. |
| 7,575,349 | B2 | 8/2009 | Bucher et al. |
| 7,635,212 | B2 | 12/2009 | Seidler |
| 7,745,818 | B2 | 6/2010 | Sofue et al. |
| 7,753,541 | B2 | 7/2010 | Chen et al. |
| 7,834,548 | B2 | 11/2010 | Jousse et al. |
| 7,862,220 | B2 | 1/2011 | Cannon et al. |
| 7,987,030 | B2 | 7/2011 | Flores et al. |
| 8,016,465 | B2 | 9/2011 | Egerer et al. |
| 8,022,818 | B2 | 9/2011 | la Tendresse et al. |
| 8,044,415 | B2 | 10/2011 | Messere et al. |
| 8,066,416 | B2 | 11/2011 | Bucher |
| 8,071,988 | B2 | 12/2011 | Lee et al. |
| 8,097,843 | B2 | 1/2012 | Agrawal et al. |
| 8,120,236 | B2 | 2/2012 | Auday et al. |
| 8,136,425 | B2 | 3/2012 | Bostick |
| 8,163,201 | B2 | 4/2012 | Agrawal et al. |
| 8,178,852 | B2 | 5/2012 | Kingsley et al. |
| 8,197,105 | B2 | 6/2012 | Yang |
| 8,203,260 | B2 | 6/2012 | Li et al. |
| 8,207,511 | B2 | 6/2012 | Bortz et al. |
| 8,232,533 | B2 | 7/2012 | Kingsley et al. |
| 8,247,761 | B1 | 8/2012 | Agrawal et al. |
| 8,286,378 | B2 | 10/2012 | Martin et al. |
| 8,408,766 | B2 | 4/2013 | Wilson et al. |
| 8,415,642 | B2 | 4/2013 | Kingsley et al. |
| 8,421,811 | B2 | 4/2013 | Odland et al. |
| 8,466,438 | B2 | 6/2013 | Lambert et al. |
| 8,519,359 | B2 | 8/2013 | Kingsley et al. |
| 8,519,362 | B2 | 8/2013 | Labrot et al. |
| 8,552,848 | B2 | 10/2013 | Rao et al. |
| 8,606,430 | B2 | 12/2013 | Seder et al. |
| 8,624,716 | B2 | 1/2014 | Englander |
| 8,631,598 | B2 | 1/2014 | Li et al. |
| 8,664,624 | B2 | 3/2014 | Kingsley et al. |
| 8,683,722 | B1 | 4/2014 | Cowan |
| 8,724,054 | B2 | 5/2014 | Jones |
| 8,754,426 | B2 | 6/2014 | Marx et al. |
| 8,773,012 | B2 | 7/2014 | Ryu et al. |
| 8,846,184 | B2 | 9/2014 | Agrawal et al. |
| 8,851,694 | B2 | 10/2014 | Harada |
| 8,876,352 | B2 | 11/2014 | Robbins et al. |
| 8,952,341 | B2 | 2/2015 | Kingsley et al. |
| 9,006,751 | B2 | 4/2015 | Kleo et al. |
| 9,018,833 | B2 | 4/2015 | Lowenthan et al. |
| 9,057,021 | B2 | 6/2015 | Kingsley et al. |
| 9,065,447 | B2 | 6/2015 | Buttolo et al. |
| 9,187,034 | B2 | 11/2015 | Tarahomi et al. |
| 9,299,887 | B2 | 3/2016 | Lowenthal et al. |
| 2002/0159741 | A1 | 10/2002 | Graves et al. |
| 2002/0163792 | A1 | 11/2002 | Formoso |
| 2003/0167668 | A1 | 9/2003 | Kuks et al. |
| 2003/0179548 | A1 | 9/2003 | Becker et al. |
| 2004/0213088 | A1 | 10/2004 | Fuwausa |
| 2006/0087826 | A1 | 4/2006 | Anderson, Jr. |
| 2006/0097121 | A1 | 5/2006 | Fugate |
| 2007/0032319 | A1 | 2/2007 | Tufte |
| 2007/0285938 | A1 | 12/2007 | Palmer et al. |
| 2007/0297045 | A1 | 12/2007 | Sakai et al. |
| 2009/0219730 | A1 | 9/2009 | Syfert et al. |
| 2009/0251920 | A1 | 10/2009 | Kino et al. |
| 2009/0260562 | A1 | 10/2009 | Folstad et al. |
| 2009/0262515 | A1 | 10/2009 | Lee et al. |
| 2011/0012062 | A1 | 1/2011 | Agrawal et al. |
| 2012/0001406 | A1 | 1/2012 | Paxton et al. |
| 2012/0104954 | A1 | 5/2012 | Huang |
| 2012/0183677 | A1 | 7/2012 | Agrawal et al. |
| 2012/0280528 | A1 | 11/2012 | Dellock et al. |
| 2013/0092965 | A1 | 4/2013 | Kijima et al. |
| 2013/0335994 | A1 | 12/2013 | Mulder et al. |
| 2014/0029281 | A1 | 1/2014 | Suckling et al. |
| 2014/0065442 | A1 | 3/2014 | Kingsley et al. |
| 2014/0103258 | A1 | 4/2014 | Agrawal et al. |
| 2014/0211498 | A1 | 7/2014 | Cannon et al. |
| 2014/0264396 | A1 | 9/2014 | Lowenthal et al. |
| 2014/0266666 | A1 | 9/2014 | Habibi |
| 2014/0373898 | A1 | 12/2014 | Rogers et al. |
| 2015/0046027 | A1 | 2/2015 | Sura et al. |
| 2015/0109602 | A1 | 4/2015 | Martin et al. |
| 2015/0138789 | A1 | 5/2015 | Singer et al. |
| 2015/0267881 | A1 | 9/2015 | Salter et al. |
| 2016/0016506 | A1 | 1/2016 | Collins et al. |
| 2016/0236613 | A1 | 8/2016 | Trier |

FOREIGN PATENT DOCUMENTS

| | | | |
|---|---|---|---|
| CN | 201193011 | Y | 2/2009 |
| CN | 204127823 | U | 1/2015 |
| DE | 4120677 | A1 | 1/1992 |
| DE | 29708699 | U1 | 7/1997 |
| DE | 10319396 | A1 | 11/2004 |
| EP | 1793261 | A1 | 6/2007 |
| EP | 2778209 | A1 | 9/2014 |
| JP | 2000159011 | A | 6/2000 |
| JP | 2007238063 | A | 9/2007 |
| KR | 20060026531 | A | 3/2006 |
| WO | 2006047306 | A1 | 5/2006 |
| WO | 2014068440 | A1 | 5/2014 |

VEHICLE BADGE

CROSS-REFERENCE TO RELATED APPLICATION

This patent application is a continuation of U.S. patent application Ser. No. 15/051,029, which was filed on Feb. 23, 2016, entitled "VEHICLE BADGE." The aforementioned related application is hereby incorporated by reference in its entirety.

FIELD OF THE INVENTION

The present disclosure generally relates to vehicle lighting systems, and more particularly, to a vehicle lighting system for a badge.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a badge for a vehicle is disclosed. The badge includes a substrate attached to a housing. The housing has a viewable portion. A first light guide is operably coupled with a first light source. A second light guide is operably coupled with a plurality of second light sources. The geometric shape of the first light guide is varied from the second light guide.

According to another aspect of the present invention, a badge for a vehicle is disclosed. The badge includes a substrate attached to a housing. The housing has a viewable portion. A first light guide is operably coupled with a first light source. A second light guide is operably coupled with a second light source. The second light guide includes a horizontally extending portion and a plurality of vertically extending portions.

According to another aspect of the present invention, a badge for a vehicle is disclosed. The badge includes a substrate attached to a housing having a viewable portion. A first light guide is operably coupled with a first light source. The first light guide is configured to diffuse light. A second light guide is operably coupled with a pair of second light sources. The second light guide blends light from each respective second light source within the second light guide.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated badge that may be attached to a vehicle. The badge may include one or more photoluminescent structures configured to convert an excitation light received from an associated light source to a converted light at a different wavelength typically found in the visible spectrum.

Figure 1A:
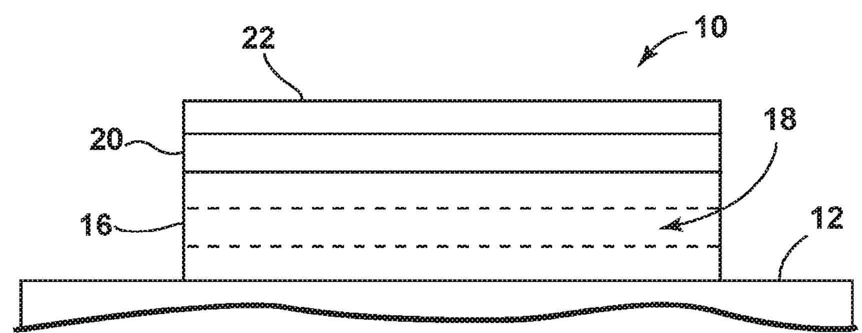
FIG. 1A is a side view of a photoluminescent structure rendered as a coating for use in a vehicle badge according to one embodiment.
Figure 1B:
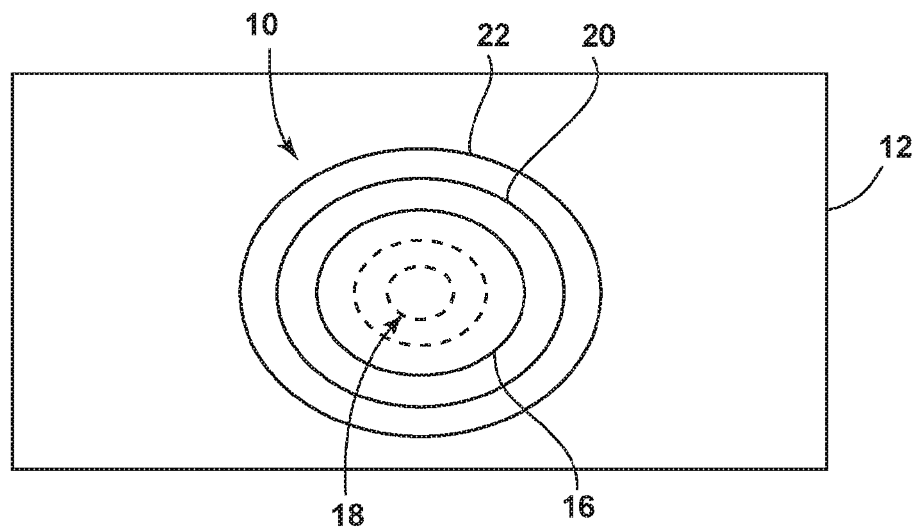
FIG. 1B is a top view of a photoluminescent structure rendered as a discrete particle according to one embodiment.
Figure 1C:
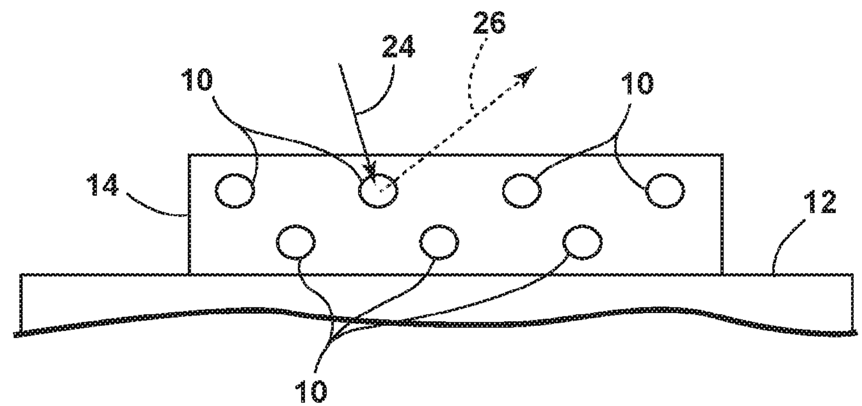
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown in broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 38 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 A1 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3-}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has a ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 $mcd/m^2$. A visibility of 0.32 $mcd/m^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 38. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit converted light 26 at or above an intensity of 0.32 $mcd/m^2$ after a period of 10 minutes. Additionally, the long persistence photoluminescent material 18 may be operable to emit converted light 26 above or at an intensity of 0.32 $mcd/m^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from a plurality of light sources 38, 64 that emit the excitation light 24, including, but not limited to, natural light sources (e.g., the sun) and/or any artificial light source 38. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 $mcd/m^2$, or any other predefined intensity level.

The long persistence photoluminescent material 18 may correspond to alkaline earth aluminates and silicates, for example doped di-silicates, or any other compound that is capable of emitting converted light 26 for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
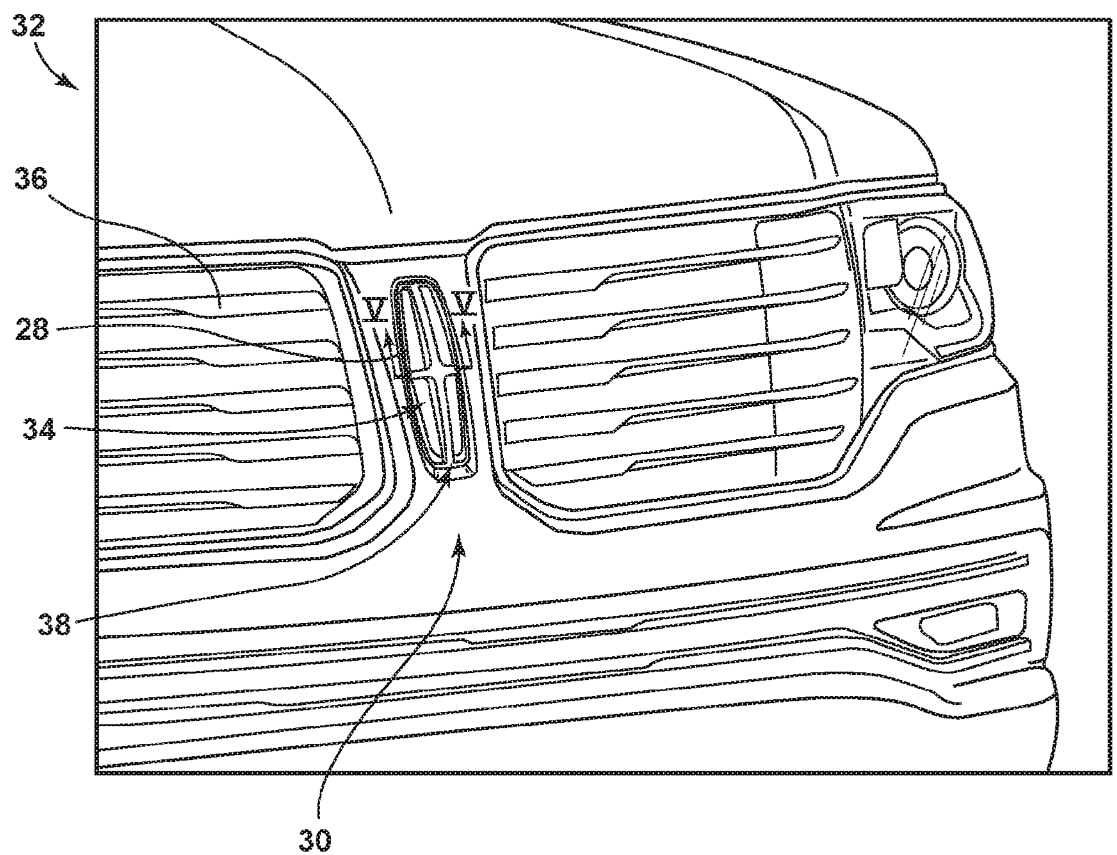
FIG. 2 is a front perspective view of a vehicle equipped with an illuminated badge on a grille assembly of a vehicle, according to one embodiment.

Referring now to FIG. 2, a badge 28 is generally shown mounted on a front portion 30 of a vehicle 32. In other embodiments, the badge 28 may be located elsewhere, such as, but not limited to, other locations of the front portion 30, a side portion, or a rear portion of the vehicle 32. Alternatively, the badge 28 may be disposed inside the vehicle 32. The badge 28 may be configured as an insignia that is presented as an identifying mark of a vehicle manufacturer and includes a viewable portion 34 that is generally prominently displayed on the vehicle 32. In the presently illustrated embodiment, the badge 28 is centrally located on a grille assembly 36 of the vehicle 32, thus allowing the badge 28 to be readily viewed by an observer looking head-on at the vehicle 32. As will be described below in greater detail, one or more light sources 38 may be disposed within the badge 28 and may illuminate in a plurality of manners to provide a distinct styling element to the vehicle 32.

Figure 3:
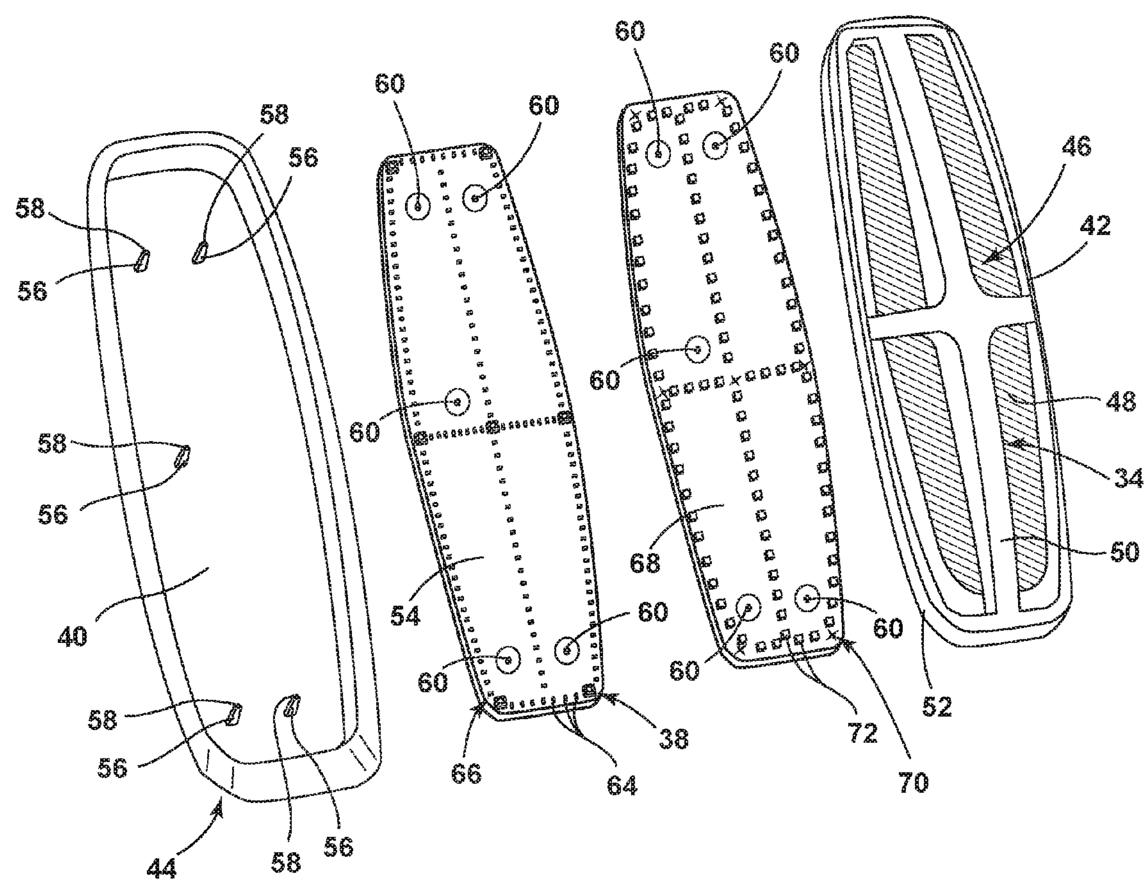
FIG. 3 is an exploded view of the badge, according to one embodiment.

Referring to FIG. 3, the badge 28 is shown, according to one embodiment, having a substrate 40 that may be attached to a housing 42. The substrate 40 may form a rear portion 44 of the badge 28 and may be capable of being secured to the vehicle 32. Alternatively, in some embodiments, the housing 42 may form the entire outer casing of the badge 28

The housing 42 may include the viewable portion 34 centrally located on a forward portion 46 thereof. The viewable portion 34 may include a background region 48 and indicia 50. The indicia 50 may signify the make, model, or any other information that may be desirable to confer about the vehicle 32 upon which the badge 28 is attached. The viewable portion 34 may include a transparent and/or translucent portion and one or more substantially opaque portion(s), which may be configured as opaque coatings applied to the viewable portion 34. In alternative embodiments, some, or all, of the viewable portion 34 may be left open to the front portion 30 of the vehicle 32.

As illustrated in FIG. 3, the housing 42 includes a peripheral portion 52 that extends rearwardly therefrom. It will be understood, however, that the peripheral portion 52, or any other portion described herein, may be integrally formed with any other components, or later attached thereto without departing from the teachings provided herein. For example, the peripheral portion 52 may be an independent component or integrally formed with the substrate 40 in alternate embodiments.

According to one embodiment, the substrate 40 and/or the housing 42 may be constructed from a rigid material such as, but not limited to, a polymeric material and may be assembled to one another via sonic welding, laser welding, vibration welding, injection molding, or any other process known in the art. Alternatively, the substrate 40 and the housing 42 may be assembled together via the utilization of adhesives and/or fasteners. Alternatively still, the substrate 40 and the housing 42 may be integrally formed as a single component.

With further reference to FIG. 3, a printed circuit board (PCB) 54 is shown that may be secured between the substrate 40 and the housing 42. According to one embodiment, the substrate 40 includes a plurality of raised platforms 56. A fastener hole 58 is defined in each platform 56. A plurality of corresponding through holes 60 is defined by the PCB 54. Accordingly, a plurality of fasteners may be disposed within the through holes 60 and into the fastener holes 58 for removably fixing the PCB 54 to the substrate 40.

The PCB 54 may have a first light source 38 and a second light source 64 disposed thereon. The light sources 38, 64 may include any form of light source. For example, fluorescent lighting, light emitting diodes (LEDs), organic LEDs (OLEDs), polymer LEDs (PLEDs), solid state lighting, or any other form of lighting configured to emit light may be utilized. According to one embodiment, the first and/or second light source 38, 64 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs. Alternatively, the first and/or second light sources 38, 64 may each emit excitation light 24 in the visible spectrum. A reflective (e.g., white) solder mask may be applied to the PCB 54 to reflect excitation and/or converted light 24, 26 incident thereon. In alternate embodiments, the light source 38 may be disposed on any other component of the badge 28 without departing from the teachings provided herein.

According to the illustrated embodiment, the badge 28 contains a plurality of first light sources 38 that may emit excitation light 24 in a multitude of colors. According to one embodiment, the plurality of first light sources 38 may be configured as LEDs having separate red, green and blue LED chips therein to form an RGB LED. The first light sources 38 are disposed at discrete locations around the badge 28. Each first light source 38 may be operated to pulse differing colors of excitation light 24 at predefined locations within the badge 28. The pulsating of excitation light 24 of differing colors may also be initiated at offset time intervals.

A plurality of second light sources 64 may be disposed within the badge 28 and may be disposed in close proximity to the plurality of first light sources 38. The plurality of second light sources 64 may be configured to emit excitation light 24 in a single color. However, it should be appreciated that all of the light sources 38, 64 disposed within the badge 28 may be configured as multicolored light sources without departing from the teachings provided herein.

As illustrated in FIG. 3, some of the plurality of first light sources 38 and the plurality of second light sources 64 may be substantially aligned along a common axis, line, plane, and/or border. For example, the plurality of first and/or second light sources 38, 64 may align with the periphery 66 of the PCB 54, the indicia 50 of the viewable portion 34, and/or any other desired pattern of the badge 28.

According to one embodiment, a pulse of excitation light 24 of a first color from a given first light source 38 may last a short period of time, approximately 1/50 to 1/100 of a second. Next, a pulse of excitation light 24 of a second color from the first light source 38 may last a short period of time, approximately 1/50 to 1/100 of a second. This process may continue through a plurality of colors by each first light source 38. Each first light source 38 may be pulsed randomly or in any predefined pattern of colors. Additionally, a variable electrical current may be supplied to each first light source 38 to adjust the degree of illumination for each pulse of colored and/or white excitation light 24. For example, the current may vary from 1 to 5 times the steady-state current. Through the use of first light sources 38, each pulsating different colors at different times, it is possible for the badge 28 to have a prismatic appearance, meaning the badge 28 may appear to resemble the colors formed by refraction of light through any shape of a two- or three-dimensional geometric object, such as a polyhedron.

In an alternative embodiment, one or more first light source(s) 38 may flash a string of colors, as described above, while any remaining first light sources 38 and/or the plurality of second light sources 64 disposed within the badge 28 emit white excitation light 24. The first light sources 38 may produce white excitation light 24 during a steady-state by illuminating each individual light emitting diode disposed within the RGB LED simultaneously. Furthermore, the first and/or second light sources 38, 64 emitting white excitation light 24 may remain at a constant color and brightness or may flicker.

With further reference to FIG. 3, a light directing member 68 may be disposed between the PCB 54 and the housing 42. The light directing member 68 may include one or more light tunnels 70 defined by the light directing member 68. The one or more tunnels 70 may align with one or more light sources 38, 64 disposed on the PCB 54.

Figure 4:
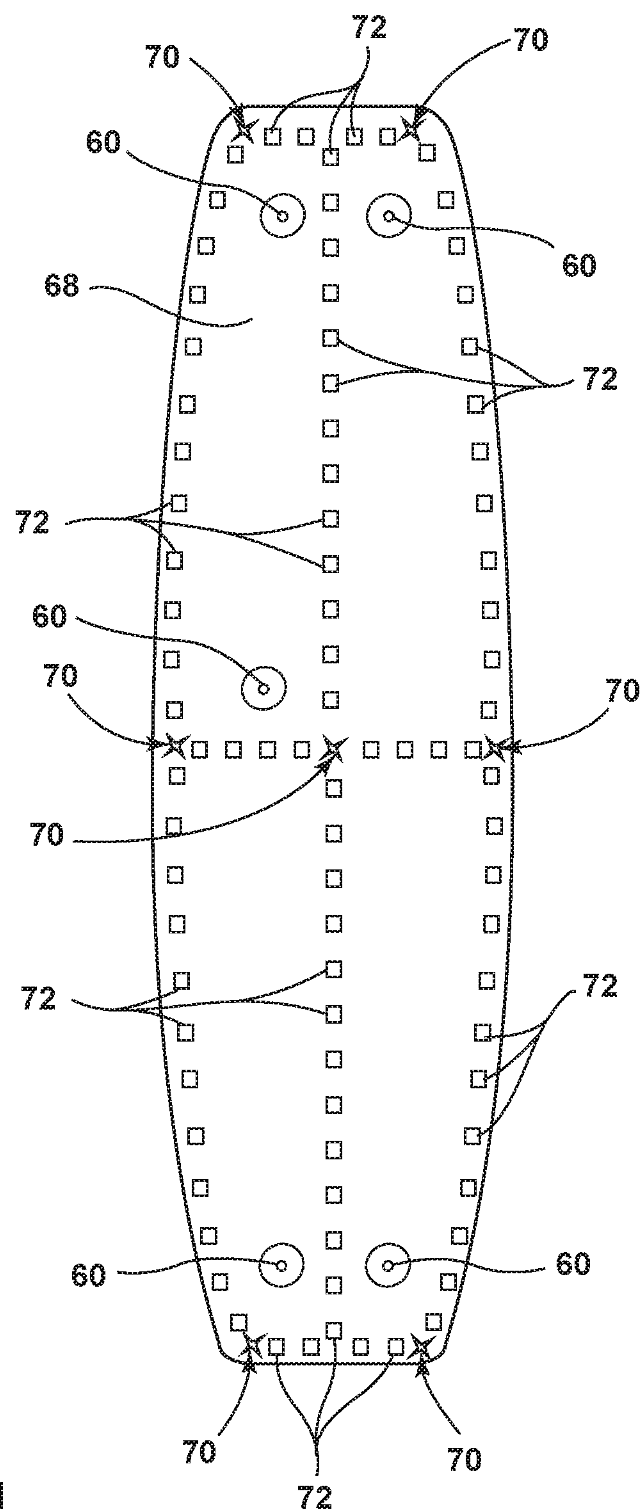
FIG. 4 is a front perspective view of a light directing member disposed within the badge having a plurality of light sources thereon, according to one embodiment.

Referring to FIG. 4, the light directing member 68 includes one or more through holes 60 that align with the through holes 60 of the PCB 54 such that both components may be secured within the badge 28. Alternatively, the light directing member 68 may be over-molded onto the PCB 54 through one or more injection molding steps such that the PCB 54 and the light directing member 68 are formed as a single integrally formed component of the badge 28.

As illustrated in FIG. 4, the light directing member 68 includes a first plurality of light tunnels 70 therethrough that have a cross section of a first geometric shape. A second plurality of light tunnels 72 may have a second geometric shape. The first geometric shape may have a different cross section than the second geometric shape. The geometric cross section of the first plurality of light tunnels 70 and the second plurality of light tunnels 72 may be any shape without departing from the teachings provided herein.

The first plurality of light tunnels 70 may align with the first light sources 38 while the second plurality of light tunnels 72 may align with second light sources 64. The first plurality of light tunnels 70 may have a four-point star cross section such that the excitation light 24 emitted therethrough has a more randomized emission pattern as the excitation light 24 is transmitted through the viewable portion 34. Such a configuration may create a prismatic appearance of the badge at the locations of the first light tunnels 70, and consequently, the first light sources 38.

Figure 5:
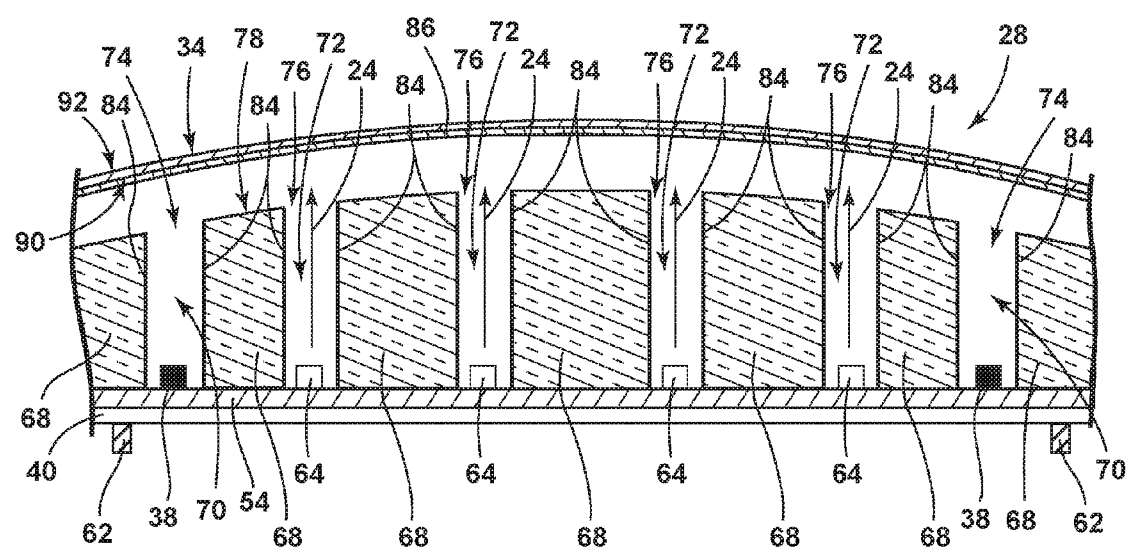
FIG. 5 is a cross-sectional view taken along the line V-V of FIG. 2 illustrating the badge having the light directing member that includes a first light tunnel extending above a first plurality of light sources and a second light tunnel extending above a second plurality of light sources, according to one embodiment.

Referring to FIG. 5, the badge 28 includes the housing 42 having the viewable portion 34, as described above, and the substrate 40 that is capable of being secured to a vehicle 32 through attachment points 62. Any practicable means may be used for attaching the badge 28 to the vehicle 32 including any known process for flushly mounting the badge 28 onto a vehicle 32, or integrally forming portions of the badge 28 (e.g., the substrate 40) with additional vehicle components, such as portions of the grille assembly 36. The rear portion 44 may be substantially linear and may be a dark, high gloss material, thereby concealing any circuitry of the badge 28 and attachment points 62.

The badge 28 further includes the light directing member 68 that includes one or more light tunnels 70, 72 therethrough. A top surface 78 of the light directing member 68 may maintain a substantially uniform distance from the housing 42 or the viewable portion 34 along the cross section of the badge 28. However, in some embodiments, the distance between the top surface 78 and the housing 42 or the viewable portion 34 may be varied along the badge 28.

The first plurality of light tunnels 70 may have any geometry, such as a polyhedron, cylinder, cone, sphere, and/or any shape and are aligned with one or more first light sources 38. Accordingly, the excitation light 24 is directed through the first plurality of light tunnels 70 towards the viewable portion 34 and exits a distal portion 74 of the first light tunnel 70 in a random direction, or in a plurality of directions. According to one embodiment, as shown in FIGS. 3 and 4, the first light tunnel 70 may have a four-point star-shaped cross section that produces an interesting and/or prismatic lighting effect that may enhance the aesthetic appearance of the badge 28 by randomizing the exiting pattern of the excitation light 24 emitted by the first light sources 38.

The badge 28 may further include one or more second light tunnels 72 that are operably coupled with the plurality of second light sources 64 and may vary in geometric shape from the one or more of the first light tunnels 70. The second light tunnels 72 may align with the second light sources 64 and below the viewable portion 34. As each second light source 64 is illuminated, a distal portion 76 of the second light tunnels 72 may emit light therefrom towards the viewable portion 34. As the plurality of second light sources 64 is sequentially illuminated, or illuminated in any other desired pattern, the portion of the indicia 50 disposed proximately to the illuminated distal portions 76 of the second light tunnel 72 may become illuminated.

Known methods of attaching the light directing member 68 to the badge 28 involve the bonding of a preformed light directing member 68 to an attachment structure within the badge 28, by adhesion, such as by using a double-sided tape, or by mechanical connections such as brackets that are formed within the badge 28. Alternatively, the substrate 40 and/or the housing 42 and the light directing member 68 may be integrally formed through a multi-shot molding process. Due to fabrication and assembly steps being performed inside the molds, molded multi-material objects allow a significant reduction in assembly operations and production cycle times. Furthermore, the product quality can be improved, and the possibility of manufacturing defects and total manufacturing costs can be reduced.

A reflective material 84 may be disposed on portions of the light directing member 68 such that incident light may be directed in any desired direction. The reflective material 84 may be an additional layer of material, such as light reflective paint, that is adhered to the desired portions of the light directing member 68. For example, the reflective material 84 may be disposed on the vertical portions of each first and second light tunnel 70, 72. Accordingly, the indicia 50 may maintain a desired color while substantially preventing the excitation and/or converted light 24, 26 emitted from other portions of the badge 28 to combine and affect the illumination of the viewable portion 34.

A light diffuser 86 may be disposed between the viewable portion 34 of the housing 42 and the light directing member 68. For example, the light diffuser 86 may be a layer that is applied to the underside of the viewable portion 34. The diffuser 86 can be transparent or translucent and generally functions to diffuse the excitation and/or converted light 24, 26 from the light directing member 68 so that unwanted hot spots and shadows are minimized. The inner surface 90 and/or outer surface 92 of the viewable portion 34 may be coated, roughened or receive micro-faceting to aid in the light diffusion performance. Additionally, or alternatively, the diffuser 86 may be applied to a portion of the light directing member 68 in order to optimize the light diffusing effect. In alternate embodiments, a light diffusing material 84 may be applied to or disposed on some or all of the first and/or second light sources 38, 64 disposed within the badge 28.

Figure 6:
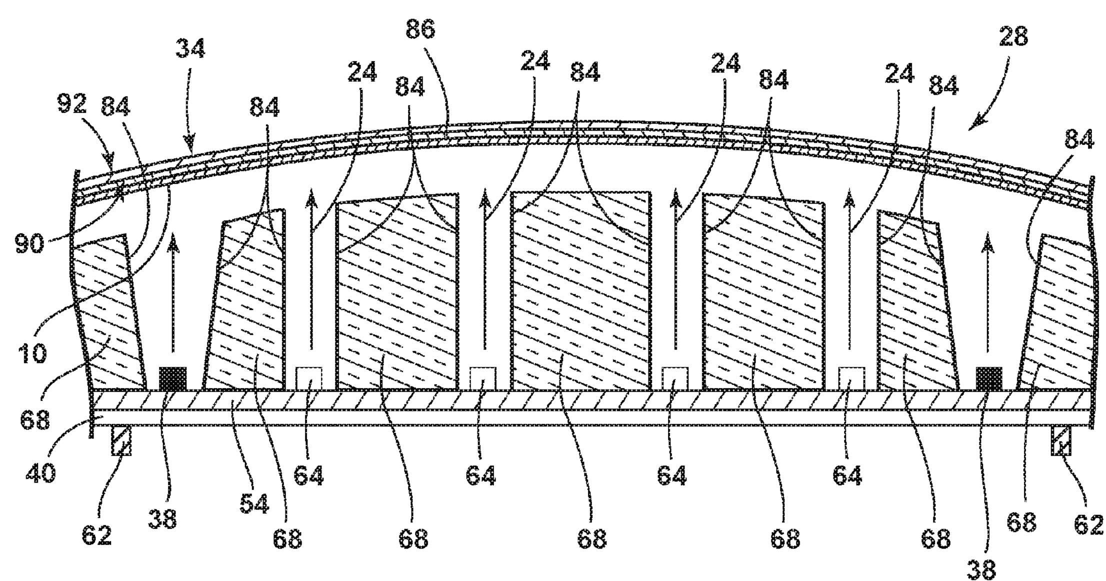
FIG. 6 is a cross-sectional view taken along the line V-V of FIG. 2 illustrating the badge, according to an alternate embodiment, having a photoluminescent structure disposed between the light directing member and a housing of the badge.

Referring to FIG. 6, the photoluminescent structure 10 may be coupled to the underside of the housing 42 and configured to luminesce in response to excitation light 24 emitted from one or more light sources 38, 64 disposed inside the badge 28. In some embodiments, the photoluminescent structure 10 may be configured as the light diffuser 86, such that both components may be combined into a single structure. Alternatively still, the photoluminescent structure 10 may be disposed within the light diffuser 86.

According to one embodiment, some, or all, of the excitation light 24 emitted from the first and/or second light sources 38, 64 is converted by the photoluminescent structure 10 into converted light 26 of a different wavelength and outputted therefrom. The converted light 26 corresponds to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent structure 10 may be configured such that converted light 26 outputted therefrom is capable of being expressed as unicolored or multicolored converted light 26. According to one embodiment, first and/or second light sources 38, 64 are configured to emit blue light and the photoluminescent structure 10 is configured to convert the blue light into a neutral white light having a color temperature of approximately 4000K to 5000K. The converted light 26 escapes from the badge 28 via the viewable portion 34, thereby causing the viewable portion 34 to glow.

In addition to illuminating, the viewable portion 34 may be configured to flash, or sparkle, at one or more locations in a multitude of colors. The locations may be chosen to correspond to a location proximately located to a corner, edge, or periphery 66 of the PCB 54. Alternatively, the locations may correspond to intersection points of the plurality of second light sources 64, when the plurality of second light sources 64 is arranged in a predefined pattern. The sparkle effect at each location may be produced by excitation light 24 emitted from a corresponding light source 38 that is disposed inside the badge 28 and positioned below the first light tunnel 70 in relative proximity to the sparkle location. Each first light source 38 may be operated to pulse excitation light 24 onto the corresponding sparkle location. According to one embodiment, a pulse of light from a given light source 38 may last approximately 1/10 to 1/100 of a second and light sources 38, 64 may be pulsed randomly or in a pattern in a multitude of colors.

According to one embodiment, the plurality of first light sources 38 may be configured as LEDs emitting a wavelength of excitation light 24 that does not excite the photoluminescent structure 10 and is instead transmitted through the photoluminescent structure 10 to directly illuminate the corresponding sparkle locations on the viewable portion 34. Alternatively, portions of the photoluminescent structure 10 located above the first light sources 38 may be removed to allow visible excitation light 24 emitted from the first light sources 38 to directly illuminate the corresponding sparkle locations without having to pass through the photoluminescent structure 10. The first light sources 38 may be chosen such that excitation light 24 emitted therefrom is relatively brighter than the luminescence exhibited by the photoluminescent structure 10 to allow the illumination to be more apparent to onlookers.

Figure 7:
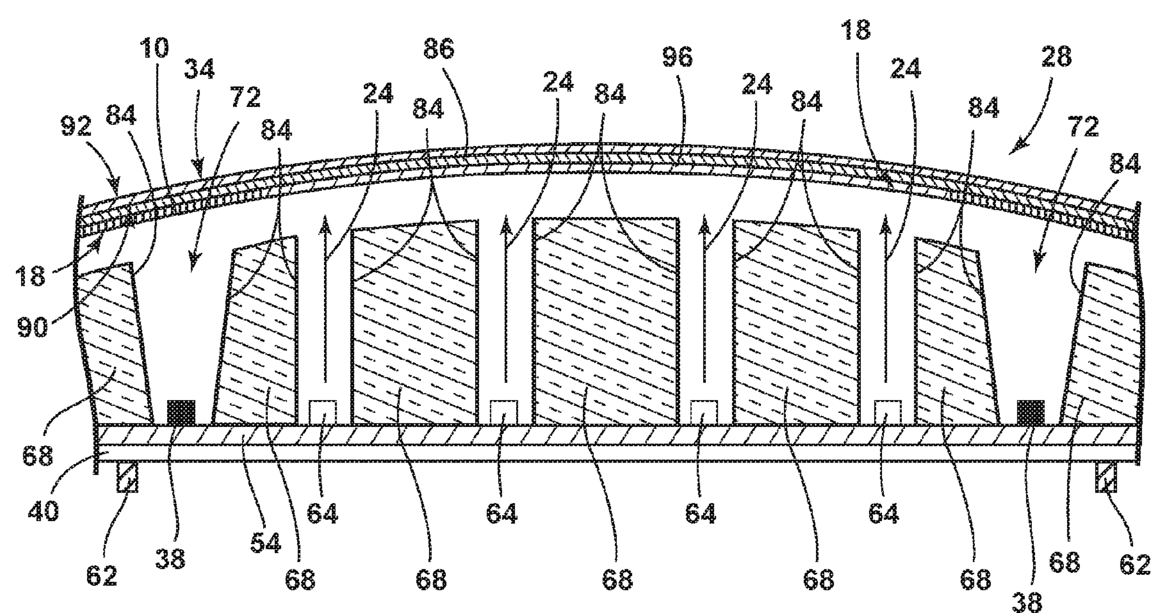
FIG. 7 is a cross-sectional view taken along the line V-V of FIG. 2 illustrating the badge, according to an alternate embodiment, having the first photoluminescent structure and a second photoluminescent structure each disposed between the light directing member and the housing of the badge.

Referring to FIG. 7, a first photoluminescent structure 10 is disposed on the housing 42 above the first light tunnel 70. The first photoluminescent structure 10 may be configured to contain one or more short persistence photoluminescent materials 18 that emit converted light 26 in response to excitation light 24 emitted from the plurality of first light sources 38. Accordingly, the first photoluminescent structure 10 may flash a plurality of colors at a fast rate. For example, each color of converted light 26 may be emitted from the first photoluminescent structure 10 for 100 milliseconds.

A second photoluminescent structure 96 may be disposed above the second light tunnel 72. The second photoluminescent structure 96 may contain various photoluminescent materials 18 therein that may be excited by the plurality of second light sources 64.

According to one embodiment, the light source 38 may emit the excitation light 24 at a first and/or a second wavelength, thereby exciting the first and/or the second photoluminescent structures 10, 96. In an alternative embodiment, the first and second photoluminescent structures 10, 96 may emit in any color necessary to remove any natural color hue of the badge 28 based on the material used to create the badge 28. For example, plastics such as polycarbonate may naturally have a yellowish hue. However, this hue may be masked through the use of the first and/or the second photoluminescent structures 10, 96 thereby making the badge 28 illuminate and appear in any desired color. Alternatively, as described above, any type of light source, multicolored or unicolored, may be utilized to make the badge 28 illuminate in any desired color without the utilization of the first and/or the second photoluminescent structures 10, 96.

The badge 28 may include a decorative layer that is disposed between the first and/or second photoluminescent structure 10, 96 and the housing 42. However, the decorative layer may be disposed in any other location within the badge 28 in alternate embodiments. The decorative layer may include a polymeric material or any other suitable material and is configured to control or modify an appearance of the viewable portion 34. For example, the decorative layer may be configured to confer a metallic appearance to the viewable portion 34. The metallic appearance can be disposed rearwardly of the housing 42, on the first photoluminescent structure 10, and/or on the second photoluminescent structure 96 through any method known in the art, including, but not limited to, sputter deposition, vacuum deposition (vacuum evaporation coating), electroplating, or directly printing onto the housing 42. The metallic appearance may be chosen from a wide range of reflective materials 84 and/or colors, including, but not limited to, silver, chrome, copper, bronze, gold, or any other metallic surface. Additionally, an imitator of any metallic material may also be utilized without departing from the teachings provided herein. The metallic layer or some portion thereof may be transparent and/or translucent to allow excitation and/or converted light 24, 26 to pass therethrough from an inner surface 90 to an outer surface 92.

In other embodiments, the decorative layer may be tinted any color to complement the vehicle structure on which the badge 28 is to be received. In any event, the decorative layer may be at least partially light transmissible such that the converted light 26 is not prevented from illuminating the viewable portion 34 whenever an energy conversion process is underway. However, the decorative layer may have opaque portions that correspond with the opaque background region 48 (FIG. 2) of the badge 28.

Figure 8:
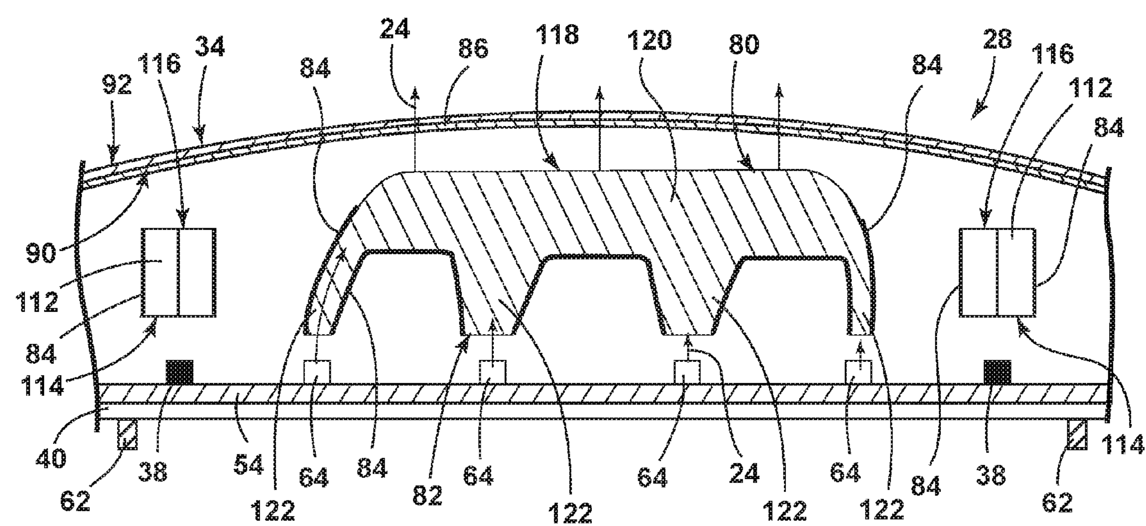
FIG. 8 is a cross-sectional view taken along the line V-V of FIG. 2 illustrating the badge, according to an alternate embodiment, having a first light guide extending above a first plurality of LED sources and a second light guide extending above a second plurality of LED sources.

Referring to FIG. 8, the badge 28 may include a first optical grade light guide 112 which is a substantially transparent or translucent pipe suitable for transmitting the excitation light 24 as emitted from the first light source 38. The first light guide 112 may have any geometry, such as a polyhedron, cylinder, cone, sphere, and/or any other three-dimensional geometric shape and is operably coupled with one or more first light sources 38. Accordingly, the excitation light 24 enters through a first surface 114 of the first light guide 112 and exits a second surface 116 of the first light guide 112 randomly through any portion of the second surface 116 in a random direction, or in a plurality of directions. According to one embodiment, the first light guide 112 may have a four-point star-shaped cross section that produces an interesting and/or prismatic lighting effect that may enhance the aesthetic appearance of the badge 28.

The badge 28 may further include one or more second light guides 118 that are operably coupled with the plurality of second light sources 64 and may vary in geometric shape from one or more of the first light guides 112. The second light guides 118 may extend over multiple second light sources 64 and below the viewable portion 34. The second light guide 118, as illustrated, includes a horizontally extending portion 120 and a plurality of vertically extending portions 122. A distal portion 80 of the second light guide 118 is disposed proximately to the viewable portion 34 of the badge 28. A proximal portion 82 is disposed proximately to each individually controlled second light source 64. As each second light source 64 is illuminated, the distal portion(s) 80 of the second light guide 118 disposed near to the second light source 64 may emit excitation light 24 therefrom. As the plurality of second light sources 64 is sequentially illuminated, or illuminated in any other desired pattern, the portion of the indicia 50 disposed proximately to the illuminated distal portions 80 of the second light guide 118 may become illuminated.

The first and/or second light guides 112, 118 may be formed from a rigid material that is comprised of a curable substrate such as a polymerizable compound, a mold in clear (MIC) material or mixtures thereof. Acrylates are also commonly used for forming rigid light pipes, as well as polymethyl methacrylate (PMMA) which is a known substitute for glass. A polycarbonate material may also be used in an injection molding process to form the rigid first and/or second light guides 112, 118.

Further, the first and/or second light guides 112, 118 may be a flexible light guide, wherein a suitable flexible material is used to create the first and/or second light guides 112, 118. Such flexible materials include urethanes, silicone, thermoplastic polyurethane (TPU), or other like optical grade flexible materials. Whether the first and/or second light guides 112, 118 are flexible or rigid, the first and/or second light guides 112, 118, when formed, are substantially optically transparent and/or translucent and capable of transmitting light. The first and/or second light guides 112, 118 may be referred to as a light pipe, a light plate, a light bar or any other light carrying substrate made from a clear or substantially translucent plastic.

Known methods of attaching the first and/or second light guides 112, 118 to the badge 28 involve the bonding of preformed first and/or second light guides 112, 118 to an attachment structure within the badge 28, by adhesion, such as by using a double-sided tape, or by mechanical connections such as brackets that are formed within the badge 28. Alternatively, the substrate 40 and/or the housing 42 and the first and/or second light guides 112, 118 may be integrally formed through a multi-shot molding process. Due to fabrication and assembly steps being performed inside the molds, molded multi-material objects allow a significant reduction in assembly operations and production cycle times. Furthermore, the product quality can be improved, and the possibility of manufacturing defects and total manufacturing costs can be reduced.

The reflective material 84 may be disposed on portions of the first and/or second light guides 112, 118 such that incident excitation and/or converted light 24, 26 may be directed in any desired direction. The reflective material 84 may be an additional layer of material, such as light reflective paint, that is adhered to the desired portions of the first and/or second light guides 112, 118. Accordingly, the indicia 50 may maintain a desired color while substantially preventing the excitation and/or converted light 24, 26 emitted from other portions to combine and affect the illumination of the viewable portion 34.

Figure 9:
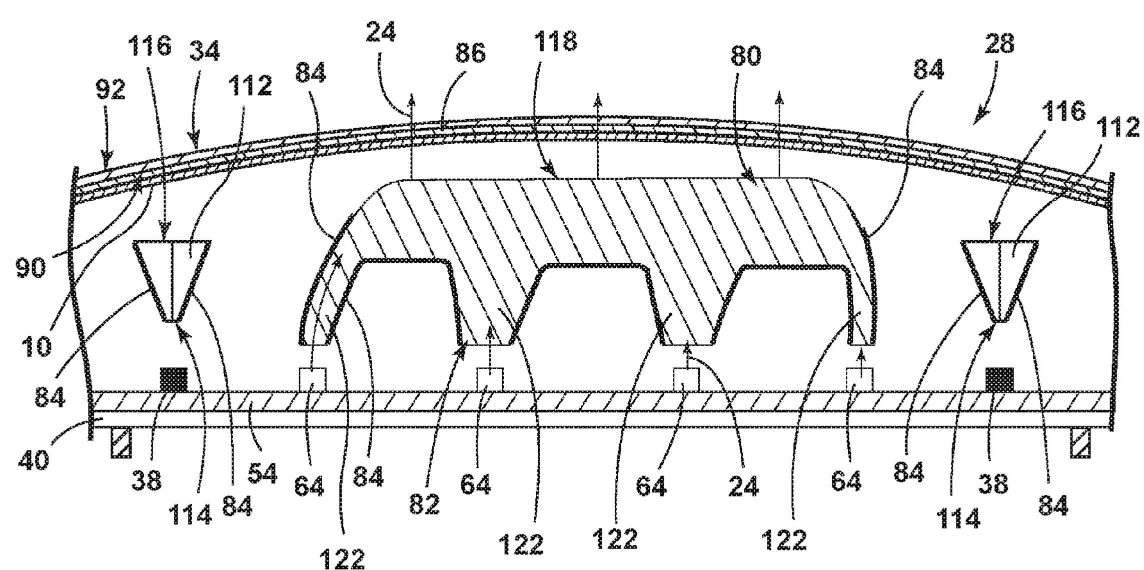
FIG. 9 is a cross-sectional view taken along the line V-V of FIG. 2, according to an alternate embodiment, illustrating the badge having a photoluminescent structure disposed between the light guide and a housing of the badge.
Figure 10:
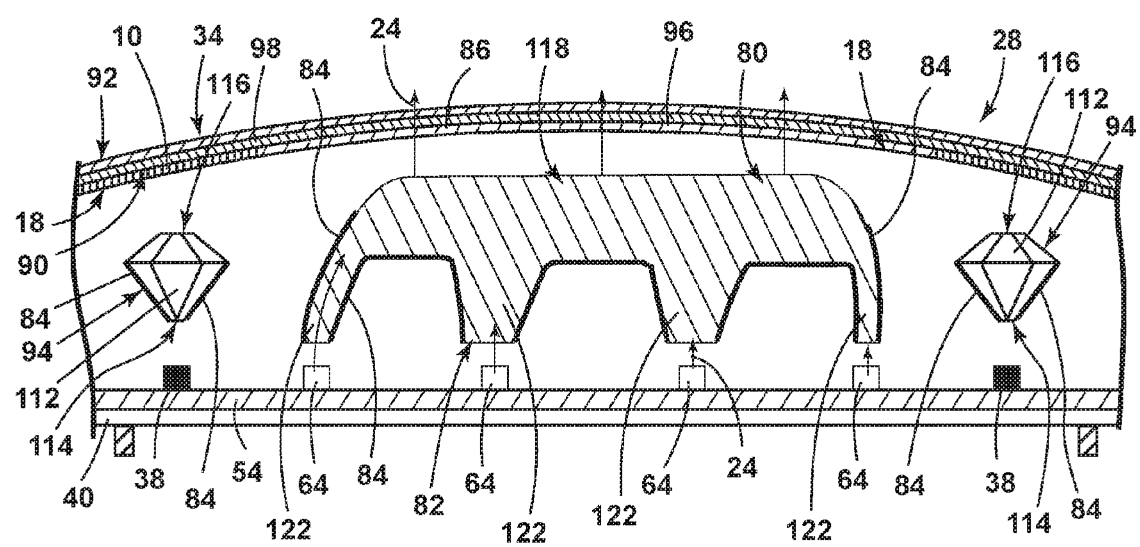
FIG. 10 is a cross-sectional view taken along the line V-V of FIG. 2, according to an alternate embodiment, illustrating the badge having a first photoluminescent structure and a second photoluminescent structure each disposed between the first and second light guides.

Referring to FIGS. 9-10, the first light guide 112 may have a geometric shape that is configured to refract excitation and/or converted light 24, 26 in a plurality of directions, such as the diamond shape 94 exemplarily illustrated in FIG. 10. Shapes, such as the diamond shape 94, may refract excitation light 24 in a plurality of directions such that the direction of the excitation light 24 emitted from the first light sources 38 is randomized.

As described above, the first photoluminescent structure 10 is disposed on the housing 42 above the first light guide 112. Likewise, the second photoluminescent structure 96 may be disposed above the second light guide 118.

Figure 11:
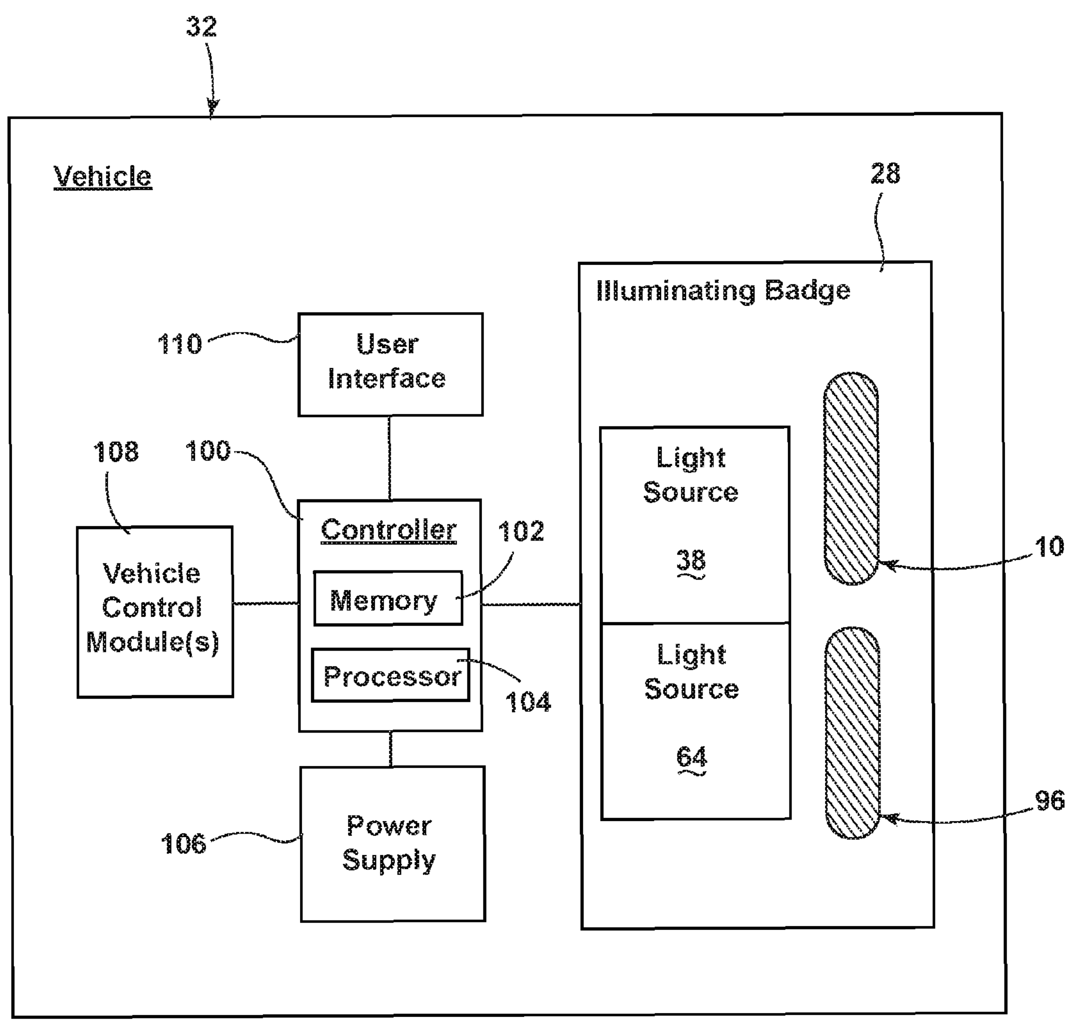
FIG. 11 is a block diagram of the vehicle having an illuminated badge incorporated therein.

Referring to FIG. 11, a block diagram of a vehicle 32 is shown in which an illuminating badge 28 is implemented. The badge 28 includes a controller 100 in communication with the first and second light sources 38, 64. The controller 100 may include memory 102 having instructions contained therein that are executed by a processor 104 of the controller 100. The controller 100 may provide electrical power to the light source via a power supply 106 located onboard the vehicle 32. In addition, the controller 100 may be configured to control the light output of each light sources 38, 64 based on feedback received from one or more vehicle control modules 108 such as, but not limited to, a body control module, engine control module, steering control module, brake control module, the like, or a combination thereof. By controlling the light output of the light source 38, 64, the badge 28 may illuminate in a variety of colors and/or patterns to provide an aesthetic appearance, such as a prismatic appearance, or may provide vehicle information to an intended observer. For example, the illumination provided by the badge 28 may be used for numerous vehicle applications, such as, but not limited to, a car finding feature, a remote start indicator, a door lock indicator, a door ajar indicator, a running light etc.

In operation, the badge 28 may exhibit a constant unicolor or multicolor illumination. For example, the controller 100 may prompt one of a plurality of first light sources 38 within the badge 28 to flash a multitude of colors at a predefined interval. Simultaneously, the remaining plurality of first and second light sources 38, 64 may illuminate in a steady unicolor, may flash through a multitude of colors, may excite the first and/or second photoluminescent structures 10, 96, and/or be placed in an off state by the controller 100. In one embodiment, the controller 100 is configured to make each second light source 64 randomly illuminate in a red color, followed by a blue color, followed by a green color, or combinations thereof. However, the controller 100 may rapidly illuminate each light source 38, 64 in any color. For example each first and second light source 38, 64 may illuminate for 1/50 to 1/100 of a second. Also, the controller 100 may vary power to each light source 38 from 1 to 5 times steady-state current to vary the color and brightness of each illumination. The controller 100 may also illuminate multiple colors within a single second light source 64 concurrently, thereby producing additional color configurations.

In another embodiment, the photoluminescent structure 10, 96 may exhibit periodic unicolor or multicolor illumination. For example, the controller 100 may prompt light source 38 to periodically emit excitation light 24 to cause the first photoluminescent structure 10 to periodically illuminate in the first color. Alternatively, the controller 100 may prompt the second light source 64 to periodically emit excitation light 24 to cause the second photoluminescent structure 96 to periodically illuminate. Alternatively, the controller 100 may control the first and second light sources 38, 64 to simultaneously and periodically emit the excitation light 24 to cause the first and second photoluminescent structures 10, 96 to periodically illuminate simultaneously.

The controller 100 may control the first and second light sources 38, 64 to periodically emit the excitation light 24 at a regular time interval and/or an irregular time interval. A multicolored, first light source 38 may also illuminate between discrete colors at a predefined interval simultaneously with the photoluminescent structure 10. Thus, the badge 28 may appear in any color based on a combination of photoluminescent structures 10, 96 while simultaneously having set points flicker in multiple different colors to create a prismatic appearance within the badge 28.

In another embodiment, the badge 28 may include a user interface 110. The user interface 110 may be configured such that a user may control the wavelength of excitation light 24 that is emitted by the light source 38. Such a configuration may allow a user to control the illumination patterns of the badge 28.

With respect to the above examples, the controller 100 may modify the intensity of the emitted excitation light 24 by pulse-width modulation or current control. Also, the controller 100 may vary power to each light source 38 from one to eight times steady-state current to vary the color and brightness of each illumination. The controller 100 may also illuminate multiple colors within a single multicolored light source 38 concurrently, thereby producing additional color configurations.

In some embodiments, the controller 100 may be configured to adjust a color of the converted light 26 by sending control signals to adjust an intensity or energy output level of the light source 38. For example, if the first and/or second light sources 38, 64 are configured to emit the excitation light 24 at a low level, substantially all of the excitation light 24 may be converted to the converted light 26 by the first and/or the second photoluminescent structures 10, 96. In this configuration, a color of light corresponding to the converted light 26 may correspond to the color of the converted light 26 from the badge 28. If the first and/or second light sources 38, 64 are configured to emit the excitation light 24 at a high level, only a portion of the excitation light 24 may be converted to the converted light 26 by the first and/or the second photoluminescent structures 10, 96. In this configuration, a color of light corresponding to a mixture of the excitation light 24 and the converted light 26 may be output as the converted light 26. In this way, the controller 100 may control an output color of the converted light 26.

Though a low level and a high level of intensity are discussed in reference to the excitation light 24, it shall be understood that the intensity of the excitation light 24 may be varied among a variety of intensity levels to adjust a hue of the color corresponding to the converted light 26 from the badge 28. The variance in intensity may be manually altered, or automatically varied by the controller 100 based on predefined conditions. According to one embodiment, a first intensity may be output from the badge 28 when a light sensor senses daylight conditions. A second intensity may be output from the badge 28 when the light sensor determines the vehicle 32 is operating in a low light environment.

As described herein, the color of the converted light 26 may be significantly dependent on the particular photoluminescent materials 18 utilized in the first and second photoluminescent structures 10, 96. Additionally, a conversion capacity of the first and second photoluminescent structures 10, 96 may be significantly dependent on a concentration of the photoluminescent material 18 utilized in the photoluminescent structures 10, 96. By adjusting the range of intensities that may be output from the first and/or second light sources 38, 64 the concentration, types, and proportions of the photoluminescent materials 18 in the photoluminescent structures 10, 96 discussed herein may be operable to generate a range of color hues of the converted light 26 by blending the excitation light 24 with the converted light 26. Moreover, the first and second photoluminescent structures 10, 96 may include a wide range of photoluminescent materials 18 that are configured to emit the converted light 26 for varying lengths of time.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have an illumination assembly disposed thereon.

According to various embodiments, a badge for a vehicle is provided herein. The badge includes a substrate attached to a housing. The housing has a viewable portion. A first light guide is operably coupled with a first light source. A second light guide is operably coupled with a plurality of second light sources. The geometric shape of the first light guide is varied from the second light guide. Embodiments of the badge can include any one or a combination of the following features:

- a first photoluminescent structure disposed above the first light guide; and a second photoluminescent structure disposed above the second light guide;
- the first light source is disposed outwardly of the plurality of second light sources;
- the first light guide has a four point star-shaped cross section that is configured to diffuse light as said light is transmitted therethrough;
- the first light source illuminates in a non-white color and wherein the plurality of second light sources illuminates in a substantially white color;
- the second light guide includes a horizontally extending portion defining a distal portion and a plurality of vertically extending portions defining a proximal portion that is disposed proximately to each of the plurality of second light sources;
- the distal portion of the second light guide is progressively illuminated as each of the plurality of second light sources is sequentially illuminated;
- the first light guide may have a geometric shape that is configured to refract light in a plurality of directions;

a first portion of the first and second light guides has a smaller cross-sectional area than a second portion of the first and second light sources, the light emitted from the first and second light sources configured to enter the first portion and exit through the second; and/or the first light source emits a first excitation light and the plurality of second light sources emits a second excitation light.

Moreover, the badge may be manufactured by attaching a substrate to a housing, the housing having a viewable portion; operably coupling a first light guide with a first light source; and operably coupling a second light guide with a plurality of second light sources, wherein a geometric shape of the first light guide is varied from the second light guide.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A badge for a vehicle, comprising:

a substrate attached to a housing of said badge;

a first light guide operably coupled with a first light source, wherein the first light guide has a four point star-shaped cross section configured to diffuse light transmitted therethrough; and a second light guide operably coupled with a plurality of second light sources, wherein a geometric shape of the first light guide is varied from the second light guide.

2. The badge for a vehicle of claim 1, wherein the first light source emits a first excitation light and the plurality of second light sources emits a second excitation light.

3. The badge for a vehicle of claim 2, further comprising:

a first photoluminescent structure disposed above the first light guide; and a second photoluminescent structure disposed above the second light guide.

4. The badge for a vehicle of claim 1, wherein the first light source is disposed outwardly of the plurality of second light sources.

5. The badge for a vehicle of claim 1, wherein the first light source illuminates in a non-white color and wherein the plurality of second light sources illuminates in a substantially white color.

6. The badge for a vehicle of claim 1, wherein the second light guide includes a horizontally extending portion defining a distal portion and a plurality of vertically extending portions defining a proximal portion that is disposed proximately to each of the plurality of second light sources.

7. The badge for a vehicle of claim 6, wherein the distal portion of the second light guide is progressively illuminated as each of the plurality of second light sources is sequentially illuminated.

8. The badge for a vehicle of claim 1, wherein the first light guide may have a geometric shape that is configured to refract light in a plurality of directions.

9. The badge for a vehicle of claim 1, wherein a first portion of the first and second light guides has a smaller cross-sectional area than a second portion of the first and second light sources, the light emitted from the first and second light sources configured to enter the first portion and exit through the second.

10. A badge for a vehicle, comprising:

a substrate attached to a housing of said badge, the housing having a viewable portion;

a first light guide operably coupled with a first light source; and a second light guide operably coupled with a second light source, wherein the second light guide includes a horizontally extending portion forwardly of a plurality of vertically extending portions, wherein each vertically extending portion is disposed over a respective second light source.

11. The badge for a vehicle of claim 10, further comprising:

a first photoluminescent structure disposed between the first light guide and the viewable portion.

12. The badge for a vehicle of claim 11, wherein the first photoluminescent structure includes a short persistence photoluminescent material therein that is configured to illuminate in a plurality of colors, wherein each color of converted light is emitted for 100 milliseconds or less once an excitation light is removed.

13. The badge for a vehicle of claim 10, wherein a distal portion of the second light guide provides illumination for indicia disposed proximately thereto.

14. A badge for a vehicle, comprising:

a substrate attached to a housing, the housing having a viewable portion;

a first light guide operably coupled with a first light source, the first light guide configured to diffuse light;

a second light guide operably coupled with a pair of second light sources, wherein the second light guide blends light from each respective second light source within the second light guide;

a photoluminescent structure including at least one photoluminescent material therein configured to perform an energy conversion on the first or second excitation light received from at least a portion of the first or second light source into a visible converted light; and a decorative layer disposed on a rear surface of the housing.

15. The badge for a vehicle of claim 14, wherein the first and second light guides include a first portion having a reflective material thereon and a second portion that is free of the reflective material.

16. The badge for a vehicle of claim 14, wherein the first light guide is configured to refract light transmitted therethrough.

* * * * *